United States Patent
Ding et al.

(10) Patent No.: US 9,342,289 B2
(45) Date of Patent: *May 17, 2016

(54) SERVICE NODE, NETWORK, AND METHOD FOR PRE-FETCHING FOR REMOTE PROGRAM INSTALLATION

(71) Applicant: International Business Machines Corporation, Armonk, NY (US)

(72) Inventors: Kai Ding, Beijing (CN); Thanh T. Pham, San Jose, CA (US); Huan L. Wang, Beijing (CN); Xiang Zhan, Beijing (CN); Hai Zhang, Beijing (CN); Yang Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/230,939

(22) Filed: Mar. 31, 2014

(65) Prior Publication Data

US 2014/0215455 A1 Jul. 31, 2014

Related U.S. Application Data

(63) Continuation of application No. 12/277,937, filed on Nov. 25, 2008, now Pat. No. 8,689,210.

(30) Foreign Application Priority Data

Nov. 30, 2007 (CN) .......................... 2007 1 0196066

(51) Int. Cl.
*G06F 9/45* (2006.01)
*G06F 9/445* (2006.01)
*G06F 12/08* (2016.01)

(52) U.S. Cl.
CPC .. *G06F 8/61* (2013.01); *G06F 8/65* (2013.01); *G06F 12/0875* (2013.01)

(58) Field of Classification Search
CPC .......... G06F 8/61; G06F 8/64; G06F 12/0875
See application file for complete search history.

(56) References Cited

U.S. PATENT DOCUMENTS 5,361,358 A 11/1994 Cox et al.
5,963,743 A * 10/1999 Amberg .................... G06F 8/61
707/999.104

(Continued)

FOREIGN PATENT DOCUMENTS

CN 101038532 9/2007
CN 101453416 A 6/2009

OTHER PUBLICATIONS

Darko Kirovski et al. "Enabling Trusted Software Integrity", [Online], ACM 2005, pp. 1-13, [Retrieved from Internet on Dec. 12, 2015], <http://delivery.acm.org/10.1145/610000/605409/p108-kirovski.pdf>.*

(Continued)

*Primary Examiner* — Xi D Chen
*Assistant Examiner* — Ziaul A Chowdhury
(74) *Attorney, Agent, or Firm* — Zilka-Kotab, PC

(57) ABSTRACT

A system for package pre-fetching for a remote program installation includes a service node having a processor, a computing node type database, and a cache, the service node being configured to receive at least one package request for a package required for an installation of an operating system and at least one peripheral application thereof from a computing node, and determine a package request sequence by which the computing node issues the at least one package request according to a type of the computing node. In another embodiment, a method includes receiving a package request from a computing node, and determining a package request sequence by which the computing node issues at least one package request according to a type of the computing node, so as to pre-read a subsequent package into a cache before the computing node issues a request for the subsequent package.

18 Claims, 5 Drawing Sheets

(56) References Cited

U.S. PATENT DOCUMENTS

| | | | |
|---|---|---|---|
| 6,138,212 A | 10/2000 | Chiacchia et al. | |
| 6,202,206 B1* | 3/2001 | Dean | G06F 8/61 709/220 |
| 6,606,744 B1 | 8/2003 | Mikurak | |
| 6,611,915 B1 | 8/2003 | Kubik et al. | |
| 6,684,397 B1 | 1/2004 | Byer et al. | |
| 6,918,113 B2 | 7/2005 | Patel et al. | |
| 6,959,320 B2 | 10/2005 | Shah et al. | |
| 7,039,766 B1 | 5/2006 | Smith | |
| 7,085,915 B1* | 8/2006 | St. John et al. | 712/205 |
| 7,143,142 B1 | 11/2006 | Piersol | |
| 7,200,689 B2 | 4/2007 | Kahle | |
| 7,238,218 B2 | 7/2007 | Hepner et al. | |
| 7,331,038 B1 | 2/2008 | Snodgrass et al. | |
| 7,472,256 B1* | 12/2008 | Nair et al. | 712/207 |
| 7,487,297 B2 | 2/2009 | El-Essawy et al. | |
| 7,512,944 B2 | 3/2009 | Schneider et al. | |
| 7,549,149 B2 | 6/2009 | Childress et al. | |
| 7,620,948 B1 | 11/2009 | Rowe et al. | |
| 7,925,491 B2* | 4/2011 | Sasatani | G06F 8/61 703/22 |
| 8,015,023 B1 | 9/2011 | Lee et al. | |
| 8,352,937 B2* | 1/2013 | Sanders | G06F 8/61 717/174 |
| 8,438,559 B2 | 5/2013 | Naslavsky et al. | |
| 8,543,998 B2 | 9/2013 | Barringer | |
| 8,689,210 B2 | 4/2014 | Ding et al. | |
| 8,893,249 B2* | 11/2014 | Arai | G06F 8/65 726/9 |
| 2001/0049769 A1* | 12/2001 | Ono | G06F 12/0875 711/118 |
| 2002/0002658 A1 | 1/2002 | Okayasu et al. | |
| 2002/0157089 A1* | 10/2002 | Patel | G06F 8/65 717/178 |
| 2002/0188942 A1* | 12/2002 | Bryan et al. | 717/176 |
| 2003/0004882 A1* | 1/2003 | Holler | G06F 8/65 705/51 |
| 2003/0046682 A1* | 3/2003 | Crespo et al. | 717/178 |
| 2003/0061451 A1 | 3/2003 | Beyda | |
| 2004/0045000 A1 | 3/2004 | Hara et al. | |
| 2004/0187104 A1 | 9/2004 | Sardesai et al. | |
| 2004/0237082 A1* | 11/2004 | Alcazar et al. | 717/174 |
| 2005/0198628 A1 | 9/2005 | Graham et al. | |
| 2005/0203968 A1 | 9/2005 | Dehghan et al. | |
| 2005/0235281 A1 | 10/2005 | Lefrancois et al. | |
| 2006/0005016 A1 | 1/2006 | Lee et al. | |
| 2006/0136367 A1 | 6/2006 | Todd | |
| 2006/0161915 A1 | 7/2006 | Barr et al. | |
| 2006/0225072 A1* | 10/2006 | Lari | G06F 8/61 717/175 |
| 2007/0124541 A1* | 5/2007 | Lang et al. | 711/137 |
| 2007/0150450 A1 | 6/2007 | Murase | |
| 2007/0198652 A1 | 8/2007 | Dickens et al. | |
| 2007/0214325 A1* | 9/2007 | Sasamoto | 711/137 |
| 2007/0234343 A1 | 10/2007 | Gouge et al. | |
| 2007/0283101 A1* | 12/2007 | El-Essawy et al. | 711/137 |
| 2008/0208789 A1 | 8/2008 | Almog et al. | |
| 2009/0144287 A1 | 6/2009 | Ding et al. | |
| 2009/0265701 A1 | 10/2009 | Naslavsky et al. | |
| 2011/0113070 A1* | 5/2011 | McCurdy | G06F 8/65 707/802 |
| 2013/0232463 A1* | 9/2013 | Nagaraja | G06F 8/61 717/101 |
| 2014/0215455 A1 | 7/2014 | Ding et al. | |

OTHER PUBLICATIONS

Amir Roth et al., "Effective Jump-Pointer Prefetching for Linked Data Structures", [Online], IEEE 1999, pp. 1-11, [Retrieved from Internet on Dec. 12, 2015], <http://ieeexplore.ieee.org/stamp/stamp.jsp?tp=&arnumber=765944>.*

Abhinav Parate et al., "Practical Prediction and Prefetch for Faster Access to Applications on Mobile phones", [Online], ACM 2013, pp. 1-10, [Retrieved from Internet on Dec. 12, 2015], <http://delivery.acm.org/10.1145/2500000/2493490/p275-parate.pdf>.*

Liang Zhong et al., "A Prefetching Framework for the Streaming Loading of Virtual Software", [Online], IEEE 2010, pp. 712-717, [Retrieved from Internet on Dec. 12, 2015], <http://ieeexplore.ieee.org/stamp/stamp.jsp?tp=&arnumber=5695671>.*

Non-Final Office Action from U.S. Appl. No. 12/277,937 dated Feb. 16, 2012.

Non-Final Office Action from U.S. Appl. No. 12/277,937 dated Jul. 18, 2012.

Non-Final Office Action from U.S. Appl. No. 12/277,937 dated Jan. 11, 2013.

Notice of Allowance and Fee(s) Due from U.S. Appl. No. 12/277,937 dated Jul. 09, 2013.

Notice of Allowance and Fee(s) Due from U.S. Appl. No. 12/277,937 dated Nov. 22, 2013.

Flower et al., "Kernel Optimizations and Prefetch with the Spike Executable Optimizer," 2001, Proc. 4th Workshop on Feedback-Directed and Dynamic Optimization (FDDO-4), 2001, pp. 1-9.

Aamodt et al., "A Framework for Modeling and Optimization of Prescient Instruction Prefetch," ACM SIGMETRICS Performance Evaluation Review, vol. 31. No. 1, ACM, 2003, pp. 13-24.

Solihin et al., "Using a User-Level Memory Thread for Correlation Prefetching," Computer Architecture, 2002. Proceedings, 29th Annual International Symposium on IEEE, 2002, pp. 1-12.

Jun et al., "An Adaptive and Selective Instruction Active Push Mechanism for Multi-Core Architecture," Networking, Architecture and Storage (NAS), 2010 IEEE Fifth International Conference on IEEE, 2010, pp. 359-366.

Boukerche et al., "Scheduling and Buffering Mechanisms for Remote Rendering Streaming in Virtual Walkthrough Class of Applications,"Proceedings of the 2nd ACM international workshop on Wireless multimedia networking and performance modeling ACM, 2006, pp. 53-60.

Huang et al., "A Dedicated Adaptive Loop Pre-fetch Mechanism for Stream-like Application," Solid-State and Integrated Circuit Technology (ICSICT), 2010 10th IEEE International Conference on IEEE, 2010, pp. 1-3.

Kirovski et al., "Enabling Trusted Software Integrity," ACM SIGPLAN Notices. vol. 37. No. 10, ACM, 2002, pp. 1-13.

Suzuki et al., "Study on Caching, Mirroring, and Pre-fetch Methods for Educational Internet," Applications and the Internet Workshops, 2001, Proceedings, 2001 Symposium on IEEE, 2001, pp. 45-50.

Ding et al., U.S. Appl. No. 12/277,937, filed Nov. 25, 2008.

* cited by examiner

SERVICE NODE, NETWORK, AND METHOD FOR PRE-FETCHING FOR REMOTE PROGRAM INSTALLATION

RELATED APPLICATIONS

This application is a continuation of copending U.S. patent application Ser. No. 12/277,937, filed Nov. 25, 2008, which claims priority to Chinese Patent Application No. 200710196066.2, filed Nov. 30, 2007, from all of which priority is claimed and which are herein incorporated by reference.

BACKGROUND

The present invention relates to a service node, network, and method for pre-fetching for remote program installation, and more particularly, relates to improving remote installation performance of operating systems and at least one peripheral application in a computer cluster environment.

Known tools help administrators remotely install operating systems and at least one peripheral application for respective client computers. A known tool includes a server-client architecture, as shown in prior art FIG. 1. A service node 10 stores software packages required for installing operating systems and at least one peripheral application associated with the operating system, to a computing node 12. Each computing node 12 runs a program installation unit 14, when the computing node 12 needs to install an operating system and at least one peripheral application of the operating system. The program installation unit 14 sequentially issues requests according to a predetermined order to the service node 10 for software packages required for installing the operating system and at least one peripheral application. The service node 10 sequentially sends software packages to the computing node 12 based on the sequential requests.

The computing node 12 may be classified according to its intended purpose. The computing node 12 may include computing nodes for scientific computation, business analysis, and statistics, for example. The operating system and at least one peripheral application needed for installation may be similar for each type of computing node 12. Therefore, while there are different types of computing nodes, the software packages which need to be requested for installing operating systems and their peripheral applications may be similar.

Software packages may be similar for each type of computing node request sequence, thus there may be request sequence similarity, because the installation of software packages needs to be done based on the installation of other software packages. The request sequence is recorded in the program installation unit 14. The computing node 12 runs the program installation unit 14, when a computing node 12 issues a package request. The program installation unit 14 sequentially issues package requests to the service node 10 according to a fixed order.

In a large cluster, response speed of a service node 10 is critical. Response speed is critical, since faster response speed of the service node 10, means reduced operating system and peripheral application installation time.

In a service node 10, a service program unit 16 sends a required software package to a computing node 12 in response to a request from the program installation unit 14 of the computing node 12. A file system cache 18 may be used in the service node 10. The service program unit 16 first searches in the cache 18, hen the unit 16 needs a package to send to the computing node 12. The cache 18 improves package reading performance of the service node 10, since a package can be read from the cache 18 faster than reading the package from an external storage device 20, for example. Thus, the service program unit 16 can respond to a package request from a computing node 12 at a higher speed using a cache 18, than without a cache.

Only packages that have been read previously can be found in the cache 18. The package must first be read from the external storage device 20 into the cache 18 by the service program unit 16. The service program unit 16 can then read out from the cache 18 when a package is read for the first time.

Packages in the cache 18 may also overflow. Due to the limited size of the cache 18, some algorithms may need to shift some packages or files out from the cache 18. Therefore, when the packages that have been previously recorded in the cache 18 are read again, it is possible packages have overflowed. Therefore, the service program unit 16 has to re-read the packages from the external storage device 20.

BRIEF SUMMARY

In one embodiment, a system for package pre-fetching for remote program installation includes a service node having a processor, a computing node type database, and a cache, the service node being configured to receive at least one package request for a package required for an installation of an operating system and at least one peripheral application thereof from a computing node, and determine a package request sequence by which the computing node issues the at least one package request according to a type of the computing node.

In another embodiment, a method for implementing package pre-fetching for remote program installation includes receiving a package request for a package required for an installation of an operating system and at least one peripheral application thereof from a computing node, and determining a package request sequence by which the computing node issues at least one package request according to a type of the computing node, so as to pre-read a subsequent package into a cache before the computing node issues a request for the subsequent package.

Various other features, exemplary features, and attendant advantages of the present disclosure will become more fully appreciated as the same becomes better understood when considered in conjunction with the accompanying drawings, in which like reference characters designate the same or similar parts throughout the several views.

BRIEF DESCRIPTION OF THE SEVERAL VIEWS OF THE DRAWINGS

The figures form a part of the specification and are used to describe the embodiments of the invention and explain the principle of the invention together with the literal statement. The foregoing and other objects, aspects, and advantages will be better understood from the following non-limiting detailed description of preferred embodiments of the invention with reference to the drawings, wherein.

DETAILED DESCRIPTION

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings.

Figure 1:
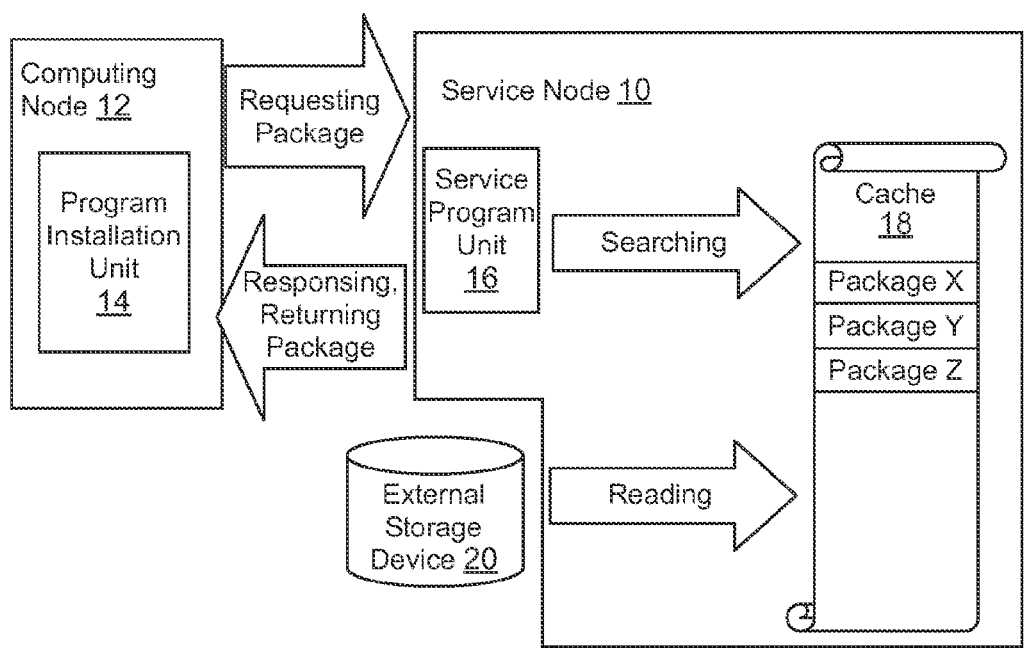
FIG. 1 is a schematic view of a prior art network architecture.
Figure 2:
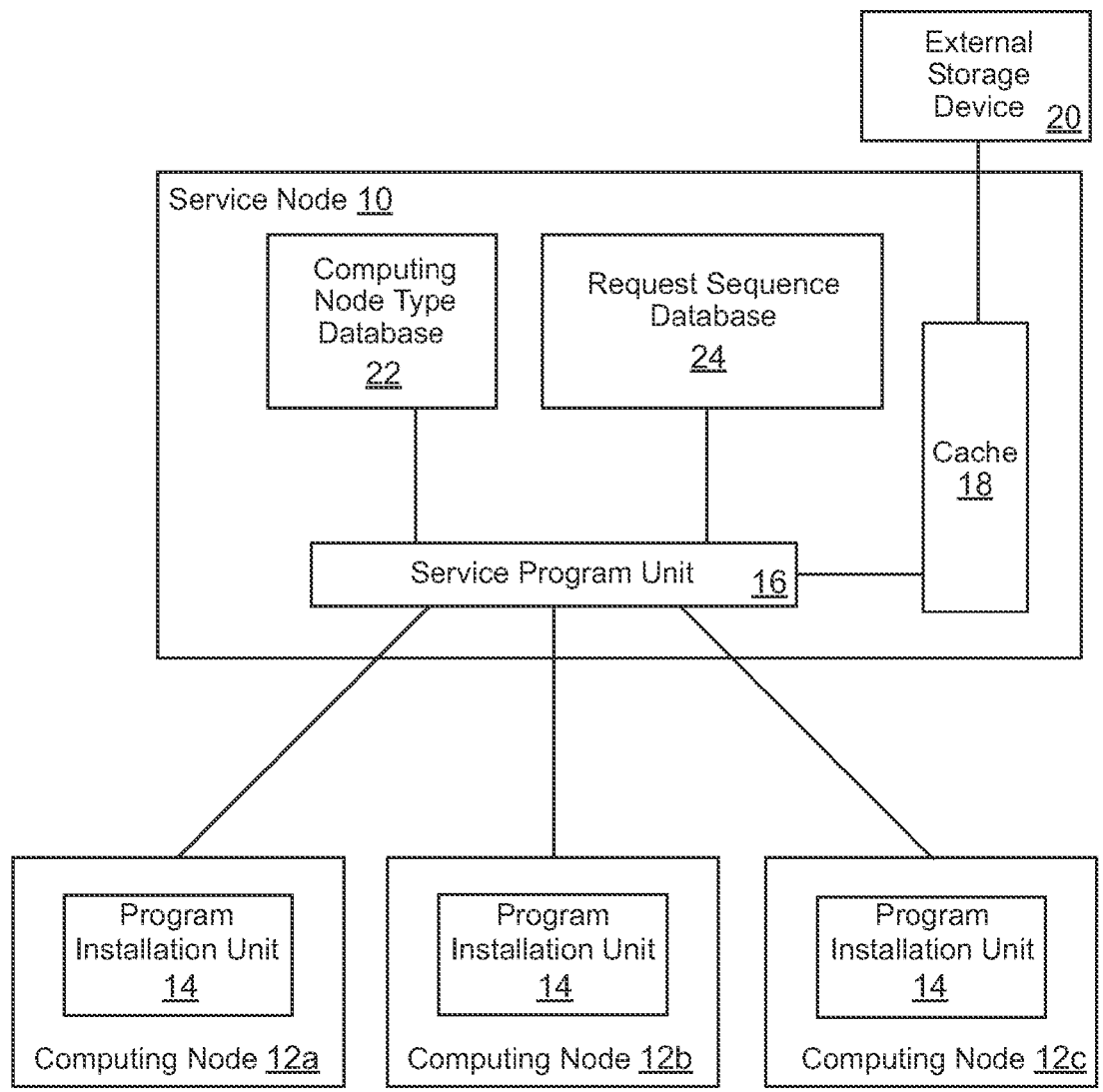
FIG. 2 is a view of network architecture according to one embodiment of the invention.

FIG. 2 shows one embodiment of a network architecture. The network includes a service node 10 and computing nodes 12a, 12b, 12c. While three computing nodes are illustrated, it is to be understood that there may be from 1 to "n" number of computing nodes 12, where "n" equals any desired number of computing nodes 12.

A computing node 12 may include an program installation unit 14 that sequentially issues at least one package request that is required for installing an operating system and at least one peripheral application associated with the operating system to the service node 10 according to a fixed request sequence. The service node 10 may include a service program unit 16, a cache 18, a computing node type database 22, and a request sequence database 24. An external storage device 20 for storing data may be coupled to service node 12. The external storage device 20 may be provided to store data, such as operating systems and their peripheral applications, which may be installed on the computing nodes 12.

The computing node type database 22 stores identification information for each computing node 12 requesting packages. The identification information for each computing node 12 may include an address, computing node type, and other identification information. The request sequence database 24 is provided for storing a package request sequence corresponding to each computing node type of the operating system and peripheral application to be installed on a computing node 12.

In one embodiment, the service program unit 16 is provided to determine the identification information, such as the address and type of computing node, of the computing node 12 issuing the package request. The service program unit 16 receives a package request from a computing node 12 and then searches the computing node type database 22 for the computing node type corresponding to the address of the computing node 12 issuing the package request. The service program unit 16 then searches the request sequence database 24 for the package request sequence corresponding to the computing node type. The service program unit 16 then pre-reads a subsequent package into the cache 18 from the external storage device 20 before the computing node 12 issues a package request for the subsequent package. In another embodiment, reading packages from the external storage device 20 is not required when the package request sequence associated with the type of the computing node 12 is already stored in the request sequence database 24. As a result, service node 10 response times are reduced substantially.

In one embodiment, the service node 10 reads a subsequent package into the cache 18 while the package is read from the external storage device 20, and while simultaneously sending the requested package, in sequence, to the computing node 12. The service node 10 reads a subsequent package in sequence into cache 18 from the external storage device 20, after receiving the package request from the computing node 12. In another embodiment, the service program unit 16 reads all packages in, other than the first package request in sequence into cache 18 from the external storage device 20 after having received the first package request and package request sequence from the computing node 12.

Figure 3:
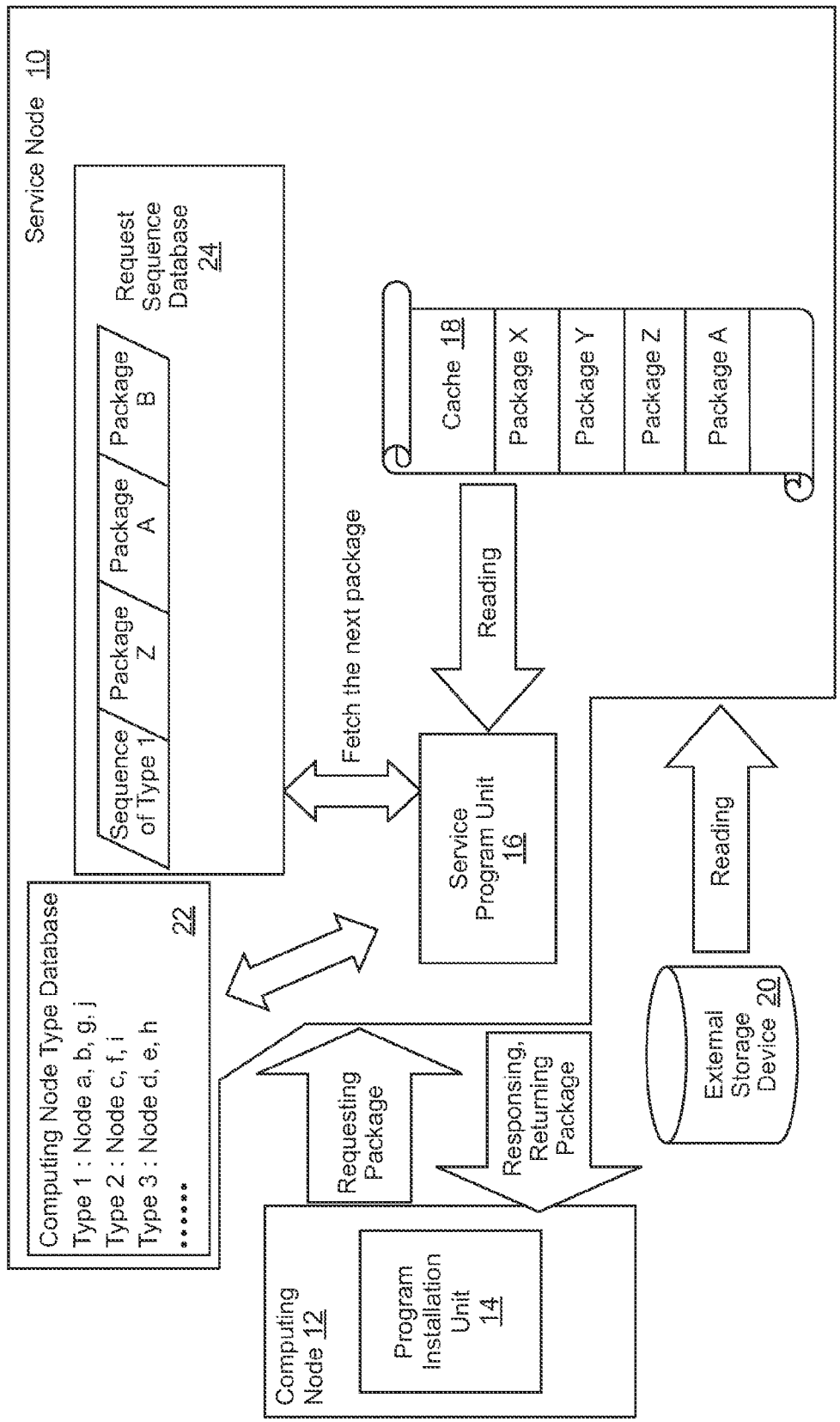
FIG. 3 is a schematic view of a flow diagram for reading packages from an external storage device into a cache in the network architecture according to one embodiment of the invention.
Figure 5:
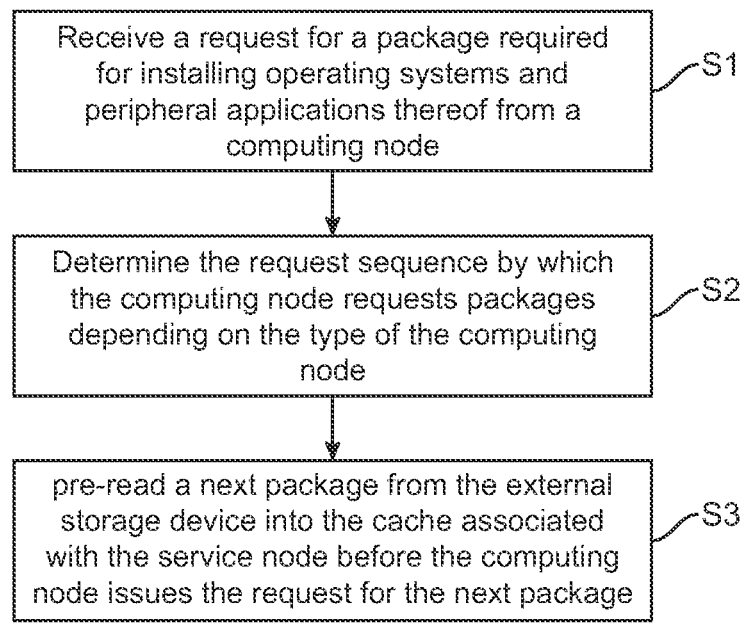
FIG. 5 is a flow chart of a method for implementing package pre-fetching for remote program installation according to one embodiment of the invention.

FIG. 3 shows a flow diagram of a network architecture and FIG. 5 shows a flow chart of an embodiment of a method. Referring to FIG. 3 and FIG. 5, in the network architecture, software packages are read into a cache 18 from an external storage device 20. In the example shown in the Figures, the software packages that are required for a computing node 12 to install an operating system, and at least one peripheral application associated with the operating system, include package Z, package A and package B. The program installation unit 14 issues a package request to the service program unit 16 in the sequence of package Z, package A, and package B.

The service program unit 16 first receives a request for package Z from a computing node 12, shown as step S1 in FIG. 5. The service program unit 16 determines the identification information, such as the address and type of computing node, of the computing node 12 issuing the request for package Z. The service program unit 16 then searches the computing node type database 22 for the computing node type corresponding to the address of the computing node 12 issuing the package request. The service program unit 16 then searches the request sequence database 24 for the package request sequence corresponding to the computing node type, shown as step S2 in FIG. 5, where it is determined that the package request sequence is package Z, package A, and then package B.

The service program unit 16 then pre-reads a subsequent package into the cache 18 from the external storage device 20 before the computing node 12 issues a package request for the subsequent package, shown as step S3 in FIG. 5. Upon receipt of the request for package Z, the service program unit 16 pre-reads package A into the cache 18 from the external storage device 20.

The service program unit 16 then sends package Z and package A simultaneously to the computing node 12. The service program unit 16 then receives a request for package A from computing node 12. The service program unit 16 then reads package B into cache 18 from the external storage device 20. The service program unit 16 searches the cache 18 for the package A, locates package A, and sends package A to the computing node 12. Computing node 12 then sends a request to the service program unit 16 for package B. Again, the service program unit 16 searches the cache 18 for the package B, locates it, and then sends package B to the computing node 12.

In another embodiment, the service program unit 16 first receives a request for package Z from a computing node 12. The service program unit 16 determines the identification information, such as the address and type of computing node, of the computing node 12 issuing the request for package Z. The service program unit 16 then searches the computing node type database 22 for the computing node type corresponding to the address of the computing node 12 issuing the package request. The service program unit 16 then searches the request sequence database 24 for the package request sequence corresponding to the computing node type, shown as step S2 in FIG. 5, where it is determined that the package request sequence is package Z, package A, and then package B. Upon receipt of the request for package Z, the service program unit 16 simultaneously reads package A and package B into the cache 18 from the external storage unit 20. Reading package B into cache 18 from the external storage device 20 may not be required if the computing node 12 sends a request to the service program unit 16.

In another embodiment, packages are not read from the external storage device 20, if the computing node 12 sends a package request to the service program unit 16. In this embodiment, the service program unit 16 reads packages from the cache 18 and not from the external storage device 20. The response time to service node 10 is substantially reduced by reading packages to the computing node 12 directly from the cache 18. The request sequence database 24 stores the package request sequence corresponding to each computing node type.

Figure 4:
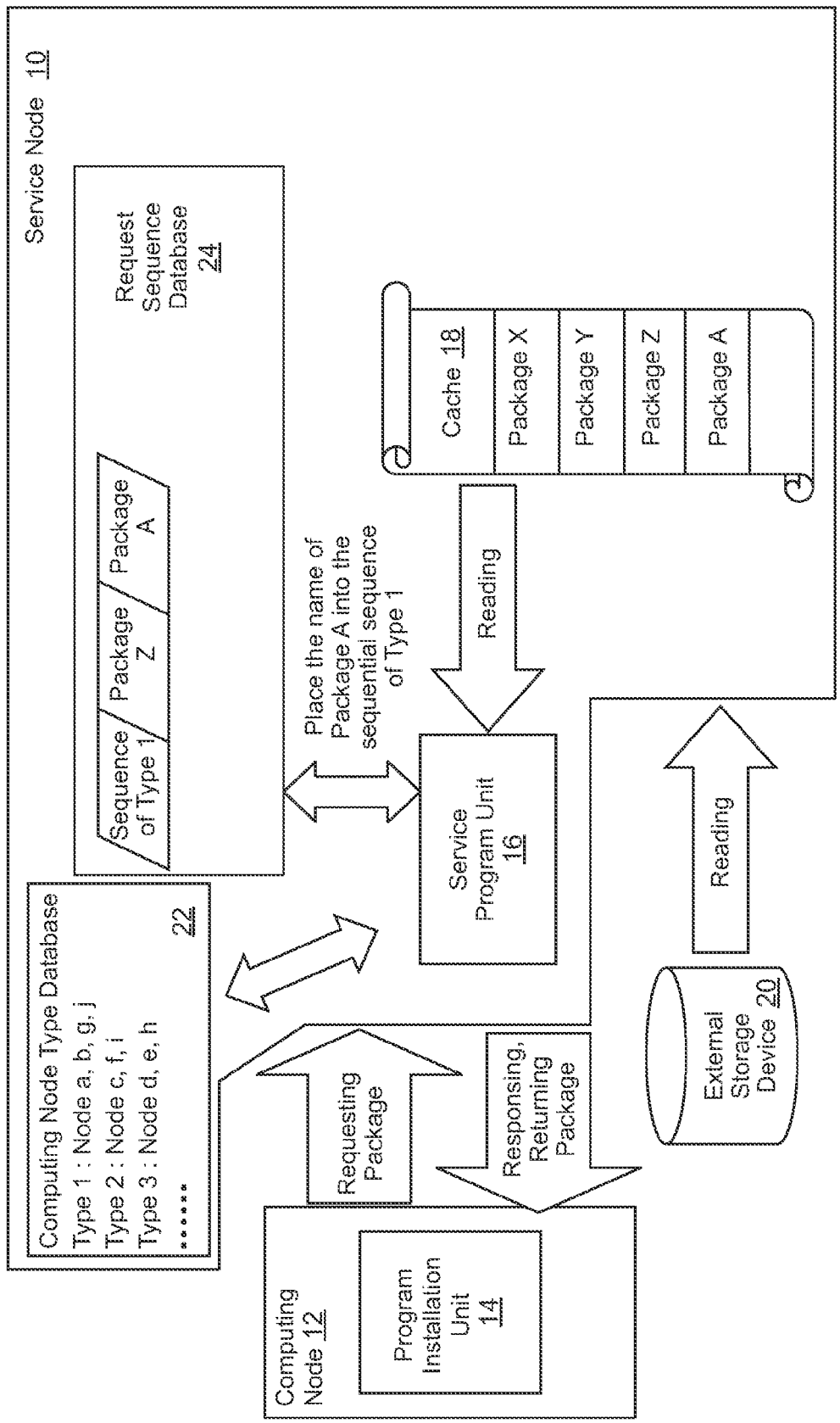
FIG. 4 is a schematic view of a flow diagram for pre-storing a package request sequence into a request sequence database in a network architecture according to one embodiment of the invention.

FIG. 4 shows a flow diagram of a network architecture for pre-storing a package request sequence in a request sequence database 24 according to one embodiment of the invention. In the embodiment, the package request sequence is recorded when a computing node 12 first receives all requested packages in the request sequence database 24.

The service program unit 16 identifies the corresponding computing node type issuing the package request. The service program unit 16 then queries the request sequence database 24 to determine if the package request sequence corresponding to the identified computing node type is stored in the database 24, when receiving a request for package Z from computing node 12. The service program 16 may indicate if the computing node 12 is not the first requesting a package in that type of computing nodes. The request sequence will not be recorded if the package request sequence corresponding to the computing node type is stored in the database 24.

The service program unit 16 may record the name of package Z in the request sequence database 24, if the package request sequence corresponding to the computing node type is not stored in the request sequence database 24. Computing node 12 receives package Z after the service program unit 16 reads package Z. The service program unit 16 then receives a request for package A from computing node 12. The service program unit 16 records the name of package A sequentially after the name of package Z, in the request sequence database 24. The service program unit 16 then reads package A and sends it to computing node 12.

Computing node 12 receives package A after the service program unit 16 reads package A. The service program unit 16 records the name of package B sequentially after the name of package A in the request sequence database 24. The service program unit 16 then reads package B and sends it to the computing node 12. The computing node 12 receives package B after the service program unit 16 reads package B.

In another embodiment, the package request sequence is recorded when a computing node 12, for each type of computing node, first acquires all requested packages in the request sequence database 24. The computing node type corresponding to the computing node 12 requesting the packages is identified by the service program unit 16, after the unit 16 receives a package request.

The service program unit 16 then determines whether the package request sequence of the computing node type is stored in the request sequence database 24. The request sequence by which the computing node 12 requests packages is not recorded if the package request sequence of that computing node type is already stored in the request sequence database 24. The package requests from the computing node 12 are sequentially received, if the package request sequence of the computing node type is not stored in the request sequence database 24. The request sequence is recorded in the request sequence database 24 after all the package requests are received if the request sequence database 24 has not yet recorded the request sequence.

In another in another embodiment, the request sequence database 24 can be disabled and the package sequence corresponding to the computing node type can be received using installation configuration files. The service program unit 16 stores the installation configuration files. The installation configuration files comprise a software package and a package request sequence for each computing node 12 installing operating systems and their associated peripheral applications. The request sequence by which the respective computing node 12 requests packages can be obtained if the installation configuration files are analyzed.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for implementing package pre-fetching for remote program installation, the method comprising:
   receiving a package request for a package required for an installation of an operating system and at least one peripheral application thereof from a computing node;
   determining a package request sequence by which the computing node issues at least one package request according to a type of the computing node, so as to pre-read a subsequent package into a cache before the computing node issues a request for the subsequent package;
   storing identification information of each computing node in the computing node type database in an association with a computing node type; and
   searching for a corresponding computing node type in the computing node type database in order to determine the package request sequence.

2. The method as recited in claim 1, further comprising:
   determining, using a hardware processor of a service node, identification information of the computing node issuing the package request.

3. The method as recited in claim 1, further comprising pre-reading a subsequent package from an external storage device into the cache prior to the computing node issuing a request for the subsequent package, wherein the cache comprises a computer readable storage device.

4. The method as recited in claim 1,
   wherein the identification information comprises an address,
   wherein the corresponding computing node type is determined by the identification information stored in the computing node type database.

5. The method as recited in claim 1, further comprising constructing a request sequence database based on one or more previous package requests from a computing node, the request sequence database being configured to store a plurality of package request sequences corresponding to each type of computing node.

6. The method as recited in claim 1, further comprising reading a subsequent package into the cache, following a requested package from an external storage device coupled to the cache, while returning the requested package to the computing node.

7. The method as recited in claim 6, further comprising reading all of the request packages other than a first package in the package request sequence from the external storage device into the cache at one time after receiving a first package request from the computing node and acquiring the package request sequence corresponding to the computing node type.

8. The method as recited in claim 1, further comprising:
searching the cache to determine whether the requested package is in the cache after receiving a package request from the computing node;
reading the requested package from an external storage device into the cache; and
reading the requested package from the cache.

9. A system for package pre-fetching for remote program installation, the system comprising:
a service node comprising a processor, a computing node type database, and a cache, the service node being configured to:
receive at least one package request for a package required for an installation of an operating system and at least one peripheral application thereof from a computing node;
determine a package request sequence by which the computing node issues the at least one package request according to a type of the computing node;
store identification information of each computing node in the computing node type database in an association with a computing node type; and
search for a corresponding computing node type in the computing node type database in order to determine the package request sequence.

10. The system as recited in claim 1, wherein the service node is further configured to pre-read a subsequent package from an external storage device into the cache prior to the computing node issuing a request for the subsequent package.

11. The system as recited in claim 1, wherein the identification information is an address.

12. The system as recited in claim 1, wherein the corresponding computing node type is determined by the identification information stored in the computing node type database.

13. The system as recited in claim 1, wherein the service node is further configured to construct a request sequence database based on one or more previous package requests from a computing node, the request sequence database being configured to store a plurality of package request sequences corresponding to each type of computing node.

14. The system as recited in claim 1, wherein the service node further comprises a request sequence database for storing a package request sequence corresponding to each type of computing node.

15. The system as recited in claim 1, further comprising the computing node, wherein the computing node is configured to issue the package request for installing the operating system and the at least one peripheral application associated with the operating system, based on an internal installation configuration file.

16. The system as recited in claim 1, further comprising an external storage device coupled to the cache, wherein the service node is further configured to read a subsequent package, following a requested package from the external storage device, into the cache while returning the requested package to the computing node.

17. The system as recited in claim 16, wherein the service node is further configured to read all of the request packages other than a first package in the package request sequence from the external storage device into the cache at one time after receiving a first package request from the computing node and acquiring the package request sequence corresponding to the computing node type.

18. The system as recited in claim 1, wherein the service node is further configured to:
search the cache to determine whether the requested package is in the cache after receiving a package request from the computing node;
read the requested package from an external storage device into the cache; and
read the requested package from the cache.

* * * * *